(12) United States Patent
Craane et al.

(10) Patent No.: US 12,084,904 B2
(45) Date of Patent: Sep. 10, 2024

(54) PINCH DETECTION SYSTEM

(71) Applicant: Inalfa Roof Systems Group B.V., Oostrum (NL)

(72) Inventors: Dennie Wilhelmus Hendrikus Craane, Nijmegen (NL); Tom Joseph Maria van de Ligt, Houthalen (BE)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 222 days.

(21) Appl. No.: 17/667,831

(22) Filed: Feb. 9, 2022

(65) Prior Publication Data

US 2022/0268073 A1 Aug. 25, 2022

(30) Foreign Application Priority Data

Feb. 11, 2021 (EP) ..................................... 21156659

(51) Int. Cl.
| | | |
|---|---|---|
| *E05F 15/41* | (2015.01) | |
| *B60J 7/05* | (2006.01) | |
| *B60J 7/057* | (2006.01) | |
| *E05F 15/659* | (2015.01) | |

(52) U.S. Cl.
CPC ............. *E05F 15/41* (2015.01); *B60J 7/0573* (2013.01); *E05F 15/659* (2015.01); *E05Y 2400/58* (2013.01); *E05Y 2900/542* (2013.01)

(58) Field of Classification Search
CPC ....... E05F 15/41; E05F 15/659; E05F 15/646; E05F 15/40; B60J 7/0573; B60J 7/00; B60J 7/057; B60J 7/22; E05Y 2400/58; E05Y 2900/542; E05Y 2400/554; E05Y 2400/564; E05Y 2800/22
See application file for complete search history.

(56) References Cited

U.S. PATENT DOCUMENTS

| | | | |
|---|---|---|---|
| 6,794,837 B1 | 9/2004 | Whinnery et al. | |
| 8,704,476 B2 | 4/2014 | Egger et al. | |
| 2004/0183493 A1 | 9/2004 | Boisvert et al. | |
| 2012/0112677 A1 | 5/2012 | Egger et al. | |
| 2022/0243521 A1* | 8/2022 | Herman | ................ E05F 15/622 |

FOREIGN PATENT DOCUMENTS

DE 4312865 A1 * 11/1993 .............. E05F 15/41

OTHER PUBLICATIONS

European Search Report for corresponding European patent application No. 21156659.1 dated Jul. 21, 2021.

* cited by examiner

*Primary Examiner* — Rodney A Butler
(74) *Attorney, Agent, or Firm* — Steven M. Koehler; Westman, Champlin & Koehler, P.A.

(57) ABSTRACT

An open-roof assembly for a vehicle roof comprises a moveably arranged closure member, a drive assembly for moving the closure member and a control unit operatively coupled to the drive assembly. The control unit comprises a pinch detection unit for detecting a pinch of the closure member with an object. The pinch detection unit comprises a first pinch detection system and a second pinch detection system. The first pinch detection system is configured to detect a pinch with a soft object and the second pinch detection system is configured to detect a pinch with a hard object. The pinch detection unit is configured to adapt a configuration setting of the first pinch detection system upon detection of a pinch with a hard object by the second pinch detection unit to configure the first pinch detection system to detect a pinch with said hard object.

13 Claims, 4 Drawing Sheets

PINCH DETECTION SYSTEM

BACKGROUND

The discussion below is merely provided for general background information and is not intended to be used as an aid in determining the scope of the claimed subject matter.

The invention relates to a pinch detection system for detecting a pinch of a moveably arranged closure member of an open-roof assembly with an object. Further, the invention relates to a corresponding method of detecting a pinch.

An open-roof assembly is well-known. The open-roof assembly is configured to be mounted in a vehicle roof and comprises at least one moveably arranged closure member. The closure member is configured and arranged to cover an opening in the vehicle roof or at least partly uncover the opening in the vehicle roof. Usually, but not necessarily, the closure member is a transparent panel and comprises glass or a suitable plastics. The closure member may be configured to tilt or to slide.

During a movement, i.e. a tilting movement or a sliding movement, a foreign object may become trapped between an edge of the opening in the vehicle roof and the moving closure member. In order to prevent damage to the closure member and the trapped object, it is known to provide a pinch detection system. Such a pinch detection system is intended to detect a pinch with a foreign object as soon as possible and to reverse a movement to ensure safe release of the foreign object. A pinch needs to be detected as soon as possible such that a force exerted on the foreign object is kept as small as possible. Legal requirements applicable in certain jurisdictions limit the maximum force under specified conditions.

Several different pinch detection system are known. One of the known kinds of pinch detection systems is an indirect system, wherein a property of the open-roof system is detected, when the closure member is moving. The detected property is immediately analysed and an unexpected value of the property may be used to determine that a pinch has occurred.

A pinch detection system needs to be able to detect a pinch with any foreign object irrespective of properties of the foreign object. Indirect pinch detection systems need to designed with different kind of properties of foreign objects in mind. In particular, a stiffness or compression rate of the object needs to be considered. The stiffer the object, i.e. the higher the compression rate of the object, the faster an exerted force increases with displacement of the closure member. The stiffness or compression rate may be represented with a spring rate expressed in N/mm. With a soft object having a relatively small spring rate, e.g. a spring rate of about 10 or about 20 N/mm, the closure member may move over a small distance before a maximum pinch force of e.g. 100N is reached, giving the pinch detection system a small period of time to accurately detect whether a pinch actually has occurred. Thus, it is possible to prevent too frequent false pinch detections. However, with a hard object having a relatively large spring rate, e.g. about 65 N/mm, there is less time available and reliable detection becomes more challenging.

It is known that known pinch detection systems are usually suitable for reliable detection of soft objects or timely detection of hard objects. Combinations of two of such systems are therefore also suggested in prior art such that both soft and hard objects may each be detected in a timely manner. The pinch detection systems suitable for hard object detection are however still susceptive to false pinch detection and thus unnecessary reversals of the closure member, which may evidently annoy vehicle occupants and other users.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

Aspects disclosed provide a pinch detection system that reliably detects a pinch with soft and hard objects in a timely manner.

In a first aspect, an open-roof assembly for covering or at least partly uncovering an opening in a vehicle roof comprises a moveably arranged closure member, a drive assembly for moving the closure member and a control unit operatively coupled to the drive assembly for controlling a movement of the closure member. The control unit comprises a pinch detection unit for detecting a pinch of the closure member with an object. The pinch detection unit comprises a first pinch detection system and a second pinch detection system. The first pinch detection system is configured to detect a pinch with a soft object having a stiffness lower than a first predetermined threshold and the second pinch detection system is configured to detect a pinch with a hard object having a stiffness higher than a second predetermined threshold. The pinch detection unit is configured to adapt a configuration setting of the first pinch detection system upon detection of a pinch with a hard object by the second pinch detection unit to configure the first pinch detection system to detect a pinch with said hard object.

The pinch detection unit comprises two separate pinch detection systems cooperating to reliably detect a pinch with any foreign object. The first pinch detection system is initially configured to reliably detect a pinch with a soft object, wherein a slow change in operation over time may be detected in time to stop or reverse the closure member. The second pinch detection system is configured to detect a pinch with a hard object, wherein a sudden change in operation may quickly be detected and acted upon. The sudden change may be detected so fast, that sudden changes due to e.g. road conditions may be detected as a pinch as well. The detection may be so fast that there remains sufficient time to have the first detection system to detect the pinch with the hard object as well by adapting a configuration setting of the first pinch detection system. Adapting such configuration setting enables the first pinch detection system to detect a hard object next to or instead of a soft object, although such configuration setting for hard object detection may result in false reversals if used continuously. However, with use of this pinch detection unit, a hard object is effectively detected twice before a reversal is initiated: a first time by the second pinch detection system and a second time by the first pinch detection unit. Thus, the chance of incorrect pinch detection is reduced. For example, a single, short deviation from normal operation may be detected by the second pinch detection system as a potential pinch with a hard object, after which the first pinch detection system may not detect any further deviation such that an incorrect pinch detection does not occur.

It is noted that the first detection unit is also operable to detect a pinch with a soft object, while the second pinch detection system detects a pinch with a hard object. The first pinch detection system may be already detecting a deviation from normal operation without determining that a soft object is pinched, when the second pinch detection system detects a potential pinch with a hard object. Then, the configuration setting of the first pinch detection system is adapted and the detection of the pinch with a hard object by the first pinch detection system may not need to start from the beginning, but may continue with the already detected deviation, ensuring a timely detection.

In an embodiment of the open-roof assembly, the pinch detection unit is configured to determine that a pinch has occurred when the first pinch detection system has detected a pinch. Essentially, the second pinch detection unit is provided to adapt the configuration setting of the first pinch detection system, when a pinch with a hard object is suspected. The actual determination that a pinch has occurred is based on a pinch detection by the first pinch detection system, irrespective of the stiffness of the foreign object.

In an embodiment of the open-roof assembly, the pinch detection unit is configured to re-adapt the configuration setting of the first pinch detection system to detect a pinch with a soft object, if a pinch with a hard object is not detected within a predetermined amount of time after adaption of the configuration setting of the first pinch detection system. If and when the second pinch detection system detects a potential pinch with a hard object, but the first pinch detection system subsequently does not detect such a pinch, the pinch detection unit may reset to its original configuration by resetting the configuration setting of the first pinch detection system to its original value. This prevents an accidental, incorrect detection of a pinch. The re-adaption of the configuration setting may be a step-wise adaption or may be a gradual adaption, for example.

In an embodiment of the open-roof assembly, the configuration setting comprises a detection threshold and the adaption of the configuration setting comprises lowering the detection threshold. A pinch with a hard object needs to be detected earlier than a pinch with a soft object as the pinch force increases faster while the closure member is moving. An earlier detection is possible by lowering a detection threshold. For example, any physical property relating to a force exerted by the drive assembly through the closure member may be monitored. Then, when such physical property exceeds a predetermined threshold, it may be considered that a pinch has occurred. Lowering the threshold inevitably results in earlier detection. Examples of a possibly relevant physical property are a motor current, a motor rotational speed, a position of the closure member, advancement in position of the closure member and combinations thereof. Other suitable properties may be used as well.

In an embodiment of the open-roof assembly, the first pinch detection system is configured to detect a pinch by comparison of a property detected during movement of the closure member with a predetermined reference value of such property. As above mentioned, a physical property relating to the movement of the closure member and/or a force exerted by the closure member may be monitored. In order to determine whether a deviation from a normal operation occurs, a reference value may be stored and be used for comparison. In a particular embodiment, such value may be dependent on a position of the closure member, for example, which may improve accuracy. Such increase in accuracy reduces the chance of an incorrect reversal, as apparent to those skilled in the art. Such a pinch detection system is as such known from prior art and is therefore not further elucidated herein.

In an embodiment of the open-roof assembly, the second pinch detection system is configured to detect a pinch by application of a mathematical model of the open-roof assembly. Using a mathematical model and suitable mathematical theory, a fast and accurate system may be designed, which is enabled to detect any unexpected behavior quickly. For example, the second pinch detection system may use a state space representation as a mathematical model and a disturbance observer to detect a deviation from a normal operation. However, other systems and mathematical operations and theory may be used alternatively or additionally.

In an aspect, a method of detecting a pinch of a moveably arranged closure member of an open-roof assembly is provided. The method comprises the steps of detecting a pinch with a soft object using a first pinch detection system, the soft object having a stiffness lower than a first predetermined threshold; and detecting a pinch with a hard object using a second pinch detection system, the hard object having a stiffness higher than a second predetermined threshold. Further, the method comprises the steps of, when the second pinch detection system detects a pinch, adapting a configuration setting of the first pinch detection system to configure the first pinch detection system to detect a pinch with a hard object; and after adapting the configuration setting of the first pinch detection system, detecting a pinch with a hard object using the first pinch detection system.

In an embodiment, the method further comprises a step of determining that a pinch has occurred when the first pinch detection system has detected a pinch in at least one of the step of detecting a pinch with a soft object and the step of detecting a pinch with a hard object.

In an embodiment, the method further comprises a step of re-adapting the configuration setting of the first pinch detection system to detect a pinch with a soft object, if a pinch with a hard object is not detected within a predetermined amount of time after adaption of the configuration setting.

In an embodiment of the method, the configuration setting comprises a detection threshold and the method comprises the step of adapting the configuration setting comprises lowering the detection threshold.

In an embodiment of the method, the step of detecting a pinch using a first pinch detection system comprises a further step that comprises the steps of detecting a property during movement of the closure member; and comparing the property with a predetermined reference value of such property.

In an embodiment of the method, the step of detecting a pinch using a second pinch detection system comprises applying a mathematical model of the open-roof assembly.

In a further aspect, a computer-readable storage medium storing computer executable instructions for instructing a control unit of an open-roof assembly to perform the method is provided. It is noted that the pinch detection unit as above described may be embodied in hardware or in software. In particular, as apparent to those skilled in the art, many processing means like a microcontroller, a microprocessor, ASIC, FPGA and the like means, may be suitably used. Further, a control unit, comprising the pinch detection unit, may be embodied with a single processing unit or with multiple processing units.

As will be appreciated by one skilled in the art, aspects of the present invention may be embodied as a system, method or computer program product. Accordingly, aspects of the present invention may take the form of an entirely hardware embodiment (analog and/or digital components), an entirely software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, an optical storage device, a magnetic storage device, or any suitable combination of the foregoing. In the context of this document, a computer readable storage medium may be any tangible medium that can comprise, or store a program for use by or in connection with an instruction execution system, apparatus, or device.

Aspects of the present invention are described below with reference to a diagram, flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by analog or digital components, or computer program instructions. These computer program instructions may be provided to a processor, in particular a microprocessor or central processing unit (CPU), a special purpose computer, or other programmable data processing apparatus to produce a machine, such that the instructions, which execute via the processor of the computer, other programmable data processing apparatus, or other devices create means for implementing the functions/acts specified in the diagram, flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the diagram, flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the diagram, flowchart and/or block diagram block or blocks.

The diagram, flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each attribute of the diagram, block of the block diagrams and/or flowchart illustrations, and combinations of attributes, blocks in the block diagrams and/or flowchart illustrations, can be implemented by special purpose hardware-based systems that perform the specified functions or acts, or combinations of special purpose hardware and computer instructions.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description with reference to the appended schematical drawings

DETAILED DESCRIPTION OF THE ILLUSTRATIVE EMBODIMENTS

The present invention will now be described with reference to the accompanying drawings, wherein the same reference numerals have been used to identify the same or similar elements throughout the several views.

Figure 1A:
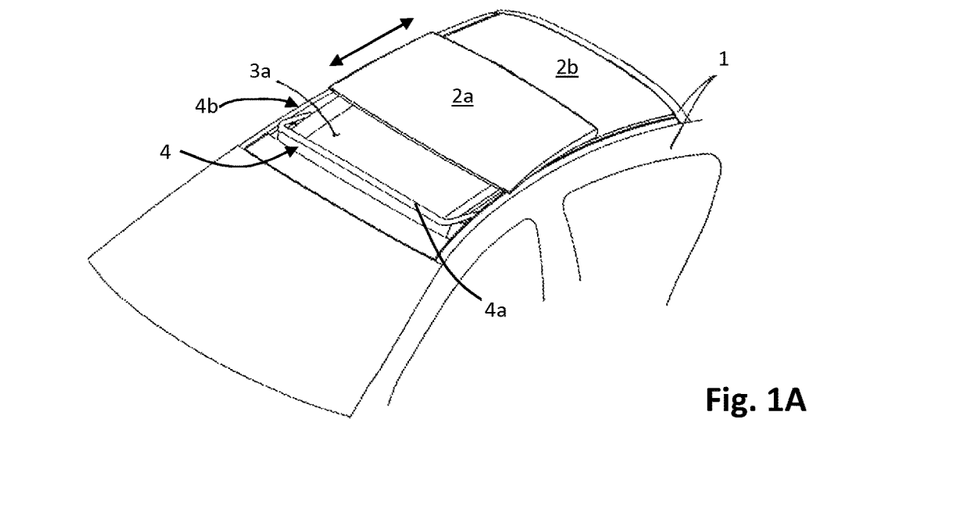
FIG. 1A shows a perspective view of a vehicle roof with an open roof assembly.

FIG. 1A illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end RE of the moveable panel 2a is raised as compared to the closed position, while a front end FE of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
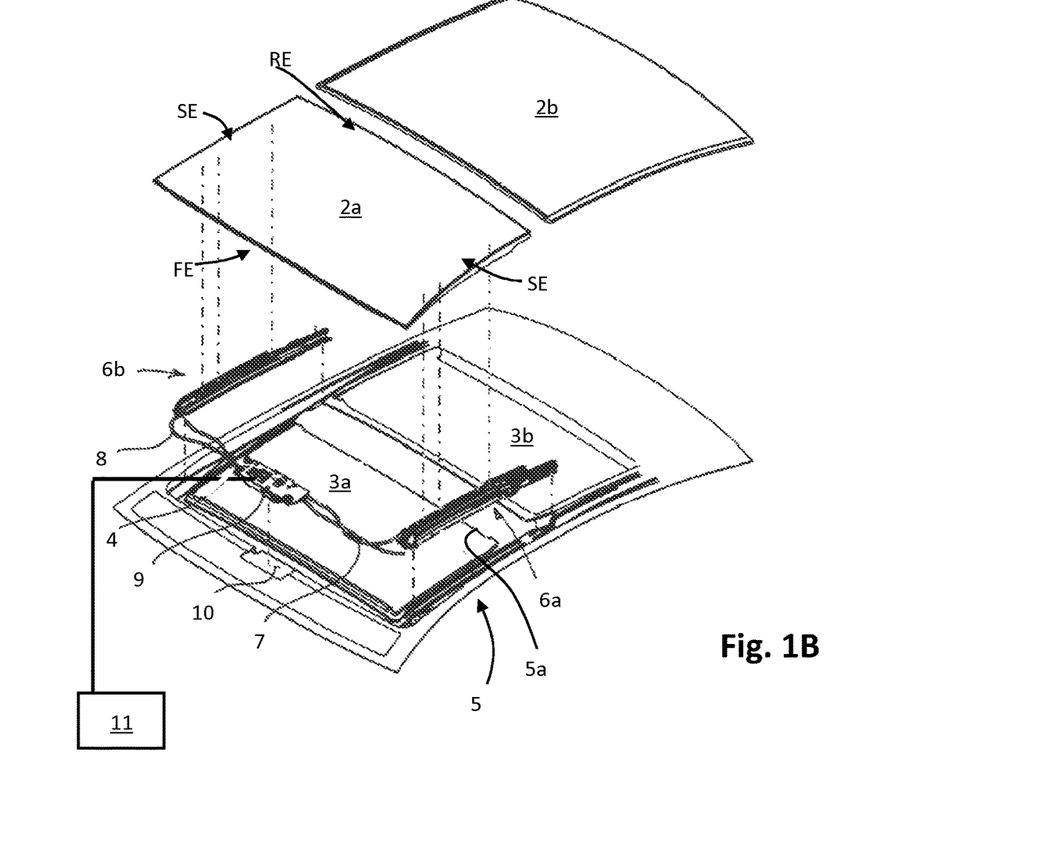
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior passenger compartment through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end FE of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a electric motor 9.

The drive cables 7, 8 couple the electric motor 9 to the mechanisms of the respective guide assemblies 6a, 6b such that upon operating the electric motor 9, the mechanisms start to move. In particular, a core of the drive cable 7, 8 is moved by the electric motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, an electric motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end RE of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end RE, while an open position is reached by first lowering the rear end RE and then sliding the moveable panel 2a under the fixed panel 2b or any other structure or element provided behind the rear end RE of the moveable panel 2a. In further exemplary embodiments, the moveable panel 2a may be merely moveable between a closed position and a tilted position or between a closed position and an open position.

In the illustrated embodiment, the electric motor 9 is mounted near or below the front end FE of the moveable panel 2a at a recess 10. In another embodiment, the electric motor 9 may be positioned at any other suitable position or location. For example, the electric motor 9 may be arranged near or below the rear end RE of the moveable panel 2a or below the fixed panel 2b.

A control module 11 is schematically illustrated and is operatively coupled to the electric motor 9. The control module 11 may be any kind of processing module, either a software controlled processing module or a dedicated processing module, like an ASIC, which are both well known to those skilled in the art. The control module 11 may be a stand-alone control module or it may be operatively connected to another control module, like a multipurpose, generic vehicle control module. In yet another embodiment, the control module 11 may be embedded in or be part of such a generic vehicle control module. Essentially, the control module 11 may be embodied by any control module suitable for, capable of and configured for performing operation of the electric motor 9 and thus the moveable roof assembly.

Figure 2A:
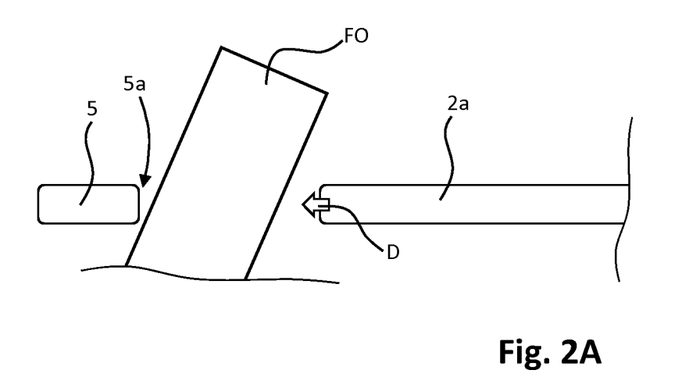
FIGS. 2A and 2B show a foreign object being pinched and trapped between a closure member and a frame of the open roof assembly of FIGS. 1A and 1B.

FIG. 2A shows a cross-section of the frame 5 and the moveable closure member 2a. A foreign object FO is arranged between the moveable closure member 2a and the edge 5a of the frame 5. The moveable closure member 2a moves in a closing direction D towards the edge 5a.

Figure 2B:
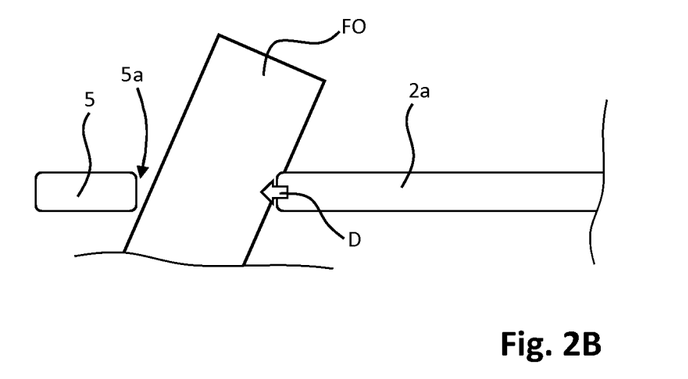

FIG. 2B shows the closure member 2a, the foreign object FO and the frame 5 of FIG. 2A, wherein the closure member 2a has advanced in the closing direction D. A front edge of the closure member 2a touches the foreign object FO. With further advancement of the closure member 2a, the foreign object FO becomes trapped between the edge 5a and the closure member 2a. Due to this entrapment, the closure member 2a can only move further in the closing direction D by compressing the foreign object FO. A stiffness of the foreign object FO determines the amount of movement possible and any force needed therefor. If the foreign object FO is soft and thus has a relatively low stiffness, e.g. expressed as a low spring rate, the closure member 2a may be advanced with a slowly increasing force. If the foreign object FO is hard and thus has a relatively high stiffness, e.g. expressed as a high spring rate, the closure member 2a can only be advanced with a rapidly increasing force.

Figure 2C:
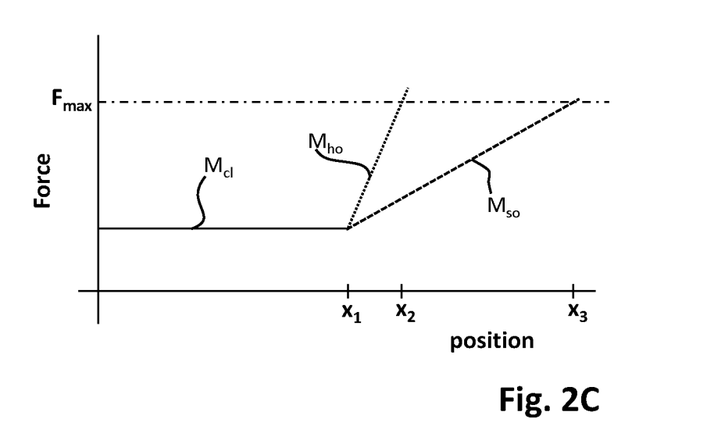
FIG. 2C illustrates a force exerted by a closure member on a trapped foreign object.

FIG. 2C illustrates a relation between position and needed force. In particular, on the horizontal axis, position is represented and the vertical axis represents an exerted force. $F_{max}$ represents a maximum force to be exerted on a foreign object before a movement of the closure member is interrupted and preferably reversed.

In FIG. 2C, the solid line shows a force exerted by or on the closure member during an undisturbed closing movement $M_{cl}$. At position $x_1$, a foreign object is pinched. If the foreign object is hard and thus has a high stiffness, an exerted force increases rapidly during a hard-object disturbed closing movement $M_{ho}$ (dotted line) and reaches the maximum force at position $x_2$. If the foreign object is soft and has a low stiffness, the exerted force increases slowly during a soft-object disturbed closing movement $M_{so}$ (dashed line) and reaches the maximum force at position $x_3$. As apparent from FIG. 2C, if a soft object is pinched, a significantly longer displacement length is available for pinch detection and interruption/reversal of the closing movement compared to a pinch with a hard object.

It is noted that upon detection of a pinch, the control unit and the drive assembly (inertia and play in the drive assembly) require some time and thus displacement of the closure member before the closure member is actually stopped or reversed. Therefore and in view of the rapid force increase in case of a pinch with a hard object, a pinch with a hard object needs to be detected at a smaller force to be in time for preventing exceeding the maximum force $F_{max}$, which makes such a detection inevitably more sensitive to incorrect pinch detection.

In order to detect both hard and soft foreign objects timely and reliably without an excessive number of incorrect detections, many different pinch detection systems have been described in prior art. Still, a single pinch detection system for any kind of foreign objects having different stiffness is not available. Therefore, combinations of two or even more pinch detection systems have been proposed. However, for reliably detecting a hard foreign object, it has remained challenging to prevent an excessive number of incorrect detections, which could lead to an excessive number of unnecessary reversals and potentially could prevent closing of the open roof assembly when driving on e.g. a rocky or bumpy road.

Figure 3A:
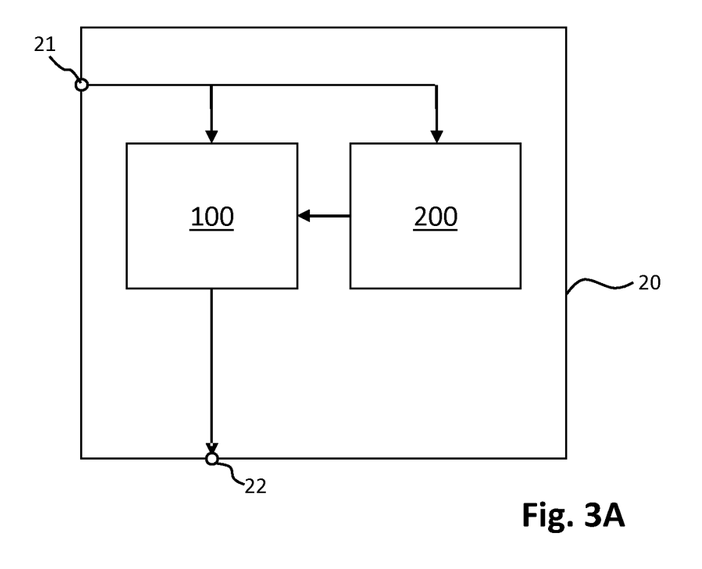
FIG. 3A shows a diagram of an embodiment of a pinch detection unit.

FIG. 3A shows an embodiment of a pinch detection unit 20 for use in, or in combination with, a control unit of an open roof assembly, for example in the control unit 11 of FIG. 1B. The pinch detection unit 20 comprises an input terminal 21 and an output terminal 22. The input terminal 21 may be configured to receive an input signal from the control unit, wherein the input signal comprises one or more data signals representing one or more physical properties sensed, measured or generated by the control unit, which physical properties relate to the movement of the closure member, as known in the art. For example, the physical properties may include a voltage and a current supplied to an electric motor, a rotational speed of such electric motor, a position of the closure member, a speed of the closure member, a temperature, and any other property relevant to the movement of the closure member. The data signals are fed to a first pinch detection system 100 and a second pinch detection system 200. All data signals may be fed to each pinch detection system 100, 200 or specific ones of the data signals may be fed to a specific one of the pinch detection systems 100, 200, e.g. dependent on which such data signals are needed by such pinch detection system 100, 200.

An output signal at the output terminal 22 is configured to indicate a detection of a pinch such that the control unit may stop or reverse the movement of the closure member in response to such an output signal.

The first pinch detection system 100 is configured to detect a pinch with a soft object. Still, the first pinch detection system 100 may be adapted by adapting a configuration setting to detect a pinch with a hard object as well, although such detection of a hard object may be less reliable.

A number of pinch detection systems are known that are suitable as the first pinch detection system. A known and common system compares a force exerted by the drive assembly driving the moveable closure member with a predetermined reference value. For increased accuracy, such reference value may be dependent on the position of the closure member. Such position dependent reference value may be determined or updated during a preceding closing movement that is executed without disturbance.

Instead of the force, any other property relating to the force may be employed. For example, the current supplied to the electric motor of the drive assembly, a voltage supplied to the electric motor of the drive assembly, a rotational motor speed, a travel speed of the closure member, and the like, may be suitable for detecting an abnormal closing operation due to a pinch.

A configuration setting of such a first pinch detection system 100 may be a threshold for a difference between the actual property value and the reference value. When the difference exceeds the threshold, a pinch may be determined to have occurred. With a soft object, a relatively high threshold may be selected as sufficient time may remain to reverse the movement before the maximum force is reached. With a hard object, detection needs to be quicker and thus needs a lower threshold, which results in less reliability as it may be accidentally exceeded, e.g. due to rocky or bumpy road conditions, for example.

The second pinch detection system 200 is configured to detect a pinch with a hard object. The second pinch detection system 200 may be suitable to detect only hard objects or may be configurable to detect a pinch with either soft or hard objects or may be suited to detect a pinch with any kind of object.

Suitable pinch detection systems for quickly detecting a pinch with a hard object are known. For example, mathematical models of the mechanical system, comprising the drive assembly and the closure member, may be used to quickly detect an abnormal movement or behavior of the mechanical system. Such a mathematical model may be used in combination with a disturbance observer and a state space representation, as known in the art.

If the second pinch detection system 200 detects the occurrence of a pinch, a configuration setting of the first pinch detection system 100 is adapted. So, as above described, a threshold may be decreased, resulting in the first pinch detection system being able to detect a pinch with either a soft or a hard object. Then, if the first pinch detection system 100 detects a pinch as well, it is presumed that the pinch actually has occurred as it has been detected twice, reducing the chance that it was an accidental, incorrect detection. The pinch detection by the first pinch detection system 100 is then used as the output signal of the pinch detection unit 20.

It is noted that the first and the second pinch detection systems 100, 200 may be different systems, but they may be similar systems as well, each having a respective configuration setting.

Figure 3B:
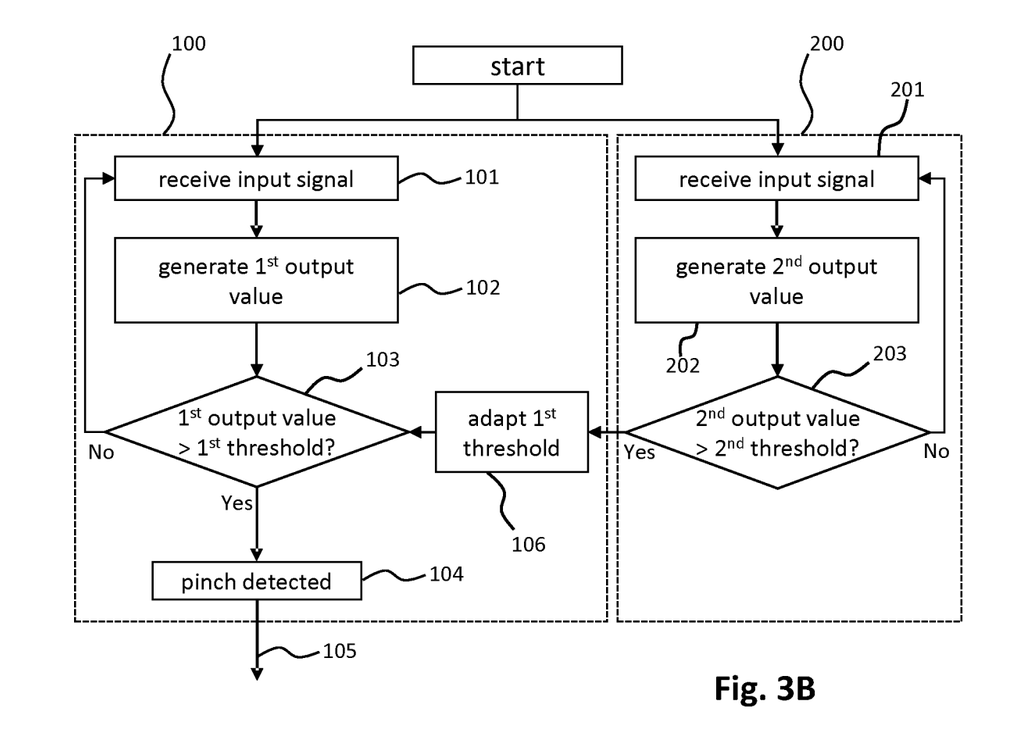
FIG. 3B shows a flow diagram illustrating an embodiment of a pinch detection method as embodied in the pinch detection unit of FIG. 3A.

FIG. 3B illustrates the method of pinch detection by the pinch detection unit 20 of FIG. 3A. The first pinch detection system 100 performs steps 100-106, while the second pinch detection system 200 performs steps 201-203.

A first step 101 of the first detection system 100 comprises receiving the input signal, representing the data needed for detecting the occurrence of a pinch. The received data are processed in a second step 102 of the first pinch detection system 100, generating at least one first output value, which is compared to a first threshold in a third step 103 of the first pinch detection system 100. If the first output value does not exceed the first threshold, the method returns to the first step 101. If it however does exceed the first threshold, the first pinch detection system 100 detects in a fourth step 104 that a pinch has occurred and a corresponding output signal 105 is generated and output.

The first step 201 of the second pinch detection system 200 comprises receiving the input signal, representing the data needed for detecting the occurrence of a pinch. The received data are processed in a second step 202 of the second pinch detection system 200, generating at least one second output value, which is compared to a second threshold in a third step 203 of the second pinch detection system 200. If the second output value does not exceed the second threshold, the method returns to the first step 201. If it however does exceed the second threshold, the second pinch detection system 200 induces a further step 106 in the first pinch detection system 100, wherein the first threshold is adapted to increase detection sensitivity for hard-object pinches.

Figure 4:
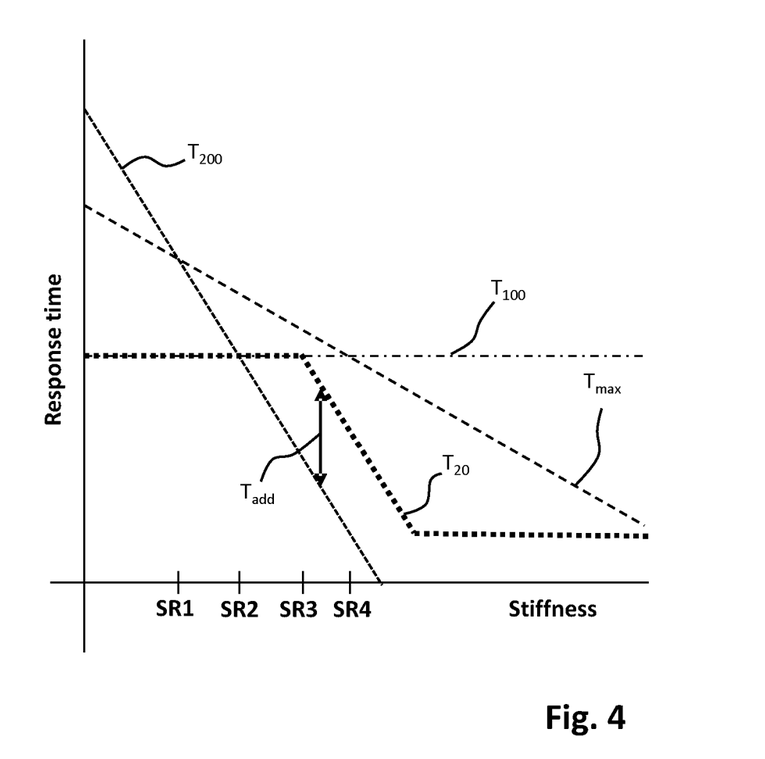
FIG. 4 shows a diagram illustrating a system response time of a pinch detection unit.

FIG. 4 illustrates schematically an overall behavior of the pinch detection unit and in particular a unit detection time $T_{20}$. In the diagram of FIG. 4, the horizontal axis represents a stiffness of a pinched object and the vertical axis represents a response time, i.e. a time needed to detect a pinch with an object.

A maximum detection time $T_{max}$ is indicated with a dashed line. For safety reasons, a pinch should be detected before the maximum detection time $T_{max}$ is exceeded to allow the open-roof assembly to stop and possibly reverse the movement of the closure member in time.

An exemplary first detection time $T_{100}$ of a first pinch detection system is indicated with a dash-dotted line. The first detection time $T_{100}$ is illustrated as a constant, i.e. independent of the stiffness. In another exemplary embodiment, this may be different. Still, in order to timely detect a pinch with a soft object, the first detection time $T_{100}$ should be below the maximum detection time $T_{max}$ for objects at least within a predetermined range of low stiffness. In the illustrated example, the first pinch detection system is configured to detect a pinch with an object having a stiffness smaller than a fourth representative spring rate SR4, since the first detection time $T_{100}$ is below the maximum detection time $T_{max}$ for such an object.

An exemplary second detection time $T_{200}$ of a second pinch detection system is indicated with a dashed line. The second detection time $T_{200}$ is illustrated having a declining slope, i.e. having a decreasing response time with increasing stiffness. In another exemplary embodiment, this may be different. Still, in order to timely detect a pinch with a hard object, the second detection time $T_{200}$ should be below the maximum detection time $T_{max}$ for objects at least within a predetermined range of high stiffness. In the illustrated example, the second pinch detection system is configured to detect a pinch with an object having a stiffness higher than a first representative spring rate SR1, since the second detection time $T_{200}$ is below the maximum detection time $T_{max}$ for such an object.

In the pinch detection unit, upon detection of a hard object by the second pinch detection system, the first detection system needs to perform a second detection to prevent an incorrect detection. Therefore, a certain period of time is needed for the first detection system after detection of a pinch with a hard object by the second detection system. This additional detection time $T_{add}$ is added to the second detection time $T_{200}$ in case of a detection of a pinch with a hard object. The additional detection time $T_{add}$ is however shorter than the first detection time $T_{100}$ due to the adapted configuration setting, e.g. an adapted threshold.

In practice, a pinch with an object may be detected in accordance with the unit response time $T_{20}$ as illustrated. For an object having a stiffness lower than a second representative spring rate SR2, the first pinch detection system will detect the pinch first. So, for a pinch with an object having a stiffness in a range of [0–SR2], the unit detection time $T_{20}$ is similar to the first detection time $T_{100}$.

For a pinch with an object having a stiffness in a range of [SR2-SR3], the second pinch detection system is expected to detect the pinch before the first pinch detection system does. The configuration setting of the first pinch detection system is then adapted accordingly. Still, in the range [SR2-SR3], even without adapting the configuration setting, the first pinch detection system would detect the pinch at the first detection time $T_{100}$. With the adaption of the configuration setting, such detection can only be sooner. So, in a worst case situation, a pinch is detected at the first detection time $T_{100}$, possibly sooner.

For a pinch with an object having a stiffness higher than a third representative spring rate SR3, the second pinch detection system detects the pinch at the second detection time $T_{200}$. Then, the configuration setting of the first pinch detection system is adapted and in the additional detection time $T_{add}$, the first detection system detects the pinch as well. Thus, the unit detection time $T_{20}$ is equal to the sum of the second detection time $T_{200}$ and the additional detection time $T_{add}$.

As above described, the graphical representation of the pinch detection unit of FIG. 4 is schematical and for illustrative purposes only. In practice, for example, the relation between response time and stiffness may not be linear and are not expected to become zero as illustrated for the second detection time 1200 for very high stiffness. A graphical representation as illustrated in FIG. 4 may however be suitable for designing and configuring the pinch detection unit. For example, the stiffness thresholds for configuration of the first and second pinch detection systems may be selected suitably to ensure a reliable pinch detection unit. In an exemplary embodiment, the stiffness threshold for the first pinch detection system, i.e. the fourth representative spring rate SR4, may be selected to be about 20 N/mm and the stiffness threshold for the second pinch detection system, i.e. the first representative spring rate SR1, may be selected to be about 15 N/mm.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. An open-roof assembly for covering or at least partly uncovering an opening in a vehicle roof, the open-roof assembly comprising:
    a moveably arranged closure member;
    a drive assembly for moving the closure member; and
    a control unit operatively coupled to the drive assembly configured to control movement of the closure member, wherein the control unit comprises a pinch detection unit configured to detect a pinch of the closure member with an object, the pinch detection unit comprising a first pinch detection system and a second pinch detection system, wherein
        the first pinch detection system is configured to detect a first pinch with a soft object having a stiffness lower than a first predetermined threshold; and
        the second pinch detection system is configured to detect a second pinch with a hard object having a stiffness higher than a second predetermined threshold; and
    wherein the pinch detection unit is configured to adapt a configuration setting of the first pinch detection system upon detection of the second pinch with the hard object by the second pinch detection system to configure the first pinch detection system to detect the second pinch with said hard object, and wherein the pinch detection unit is configured to determine that the second pinch has occurred when the first pinch detection system has detected the second pinch.

2. The open-roof assembly according to claim 1, wherein the pinch detection unit is configured to re-adapt the configuration setting of the first pinch detection system to detect another pinch with another soft object, if the second pinch with the hard object is not detected within a predetermined amount of time after adaption of the configuration setting of the first pinch detection system.

3. The open-roof assembly according to claim 1, wherein the configuration setting comprises a detection threshold and wherein adaption of the configuration setting comprises lowering the detection threshold.

4. The open-roof assembly according to claim 1, wherein the first pinch detection system is configured to detect each pinch by comparison of a property detected during movement of the closure member with a predetermined reference value of such property.

5. The open-roof assembly according to claim 1, wherein the second pinch detection system is configured to detect each pinch with the hard object by application of a mathematical model of the open-roof assembly.

6. A method of detecting a pinch of a moveably arranged closure member of an open-roof assembly, the method comprising:
    providing a control unit operatively coupled to a drive assembly configured to control movement of the closure member, wherein the control unit comprises a pinch detection unit configured to detect a pinch of closure member with an object, the pinch detection unit comprising a first pinch detection system and a second pinch detection system;
    detecting a first pinch with a soft object using the first pinch detection system, the soft object having a stiffness lower than a first predetermined threshold;
    detecting a second pinch with a hard object using the second pinch detection system, the hard object having a stiffness higher than a second predetermined threshold;
    when the second pinch detection system detects the second pinch, adapting a configuration setting of the first pinch detection system to configure the first pinch detection system to detect the second pinch with the hard object; and
    after adapting the configuration setting of the first pinch detection system, detecting the second pinch with the hard object using the first pinch detection system; and
    determining that each pinch has occurred when the first pinch detection system has detected a physical property of the closure member or a motor driving the closure member.

7. The method according to claim 6, wherein the method further comprises
    re-adapting the configuration setting of the first pinch detection system to detect each pinch with each soft object, if the second pinch with the hard object is not detected within a predetermined amount of time after adaption of the configuration setting.

8. The method according to claim 6, wherein the configuration setting comprises a detection threshold and adapting the configuration setting comprises lowering the detection threshold.

9. The method according to claim 6, wherein detecting the second pinch using the first pinch detection system comprises:
    detecting a property during movement of the closure member; and
    comparing the property with a predetermined reference value of the property.

10. The method according to claim 6, wherein detecting the second pinch using the second pinch detection system comprises applying a mathematical model of the open-roof assembly.

11. A non-transitory, tangible computer-readable storage medium storing computer executable instructions for instructing a control unit to control movement of a closure member of an open-roof assembly, the executable instructions configured to perform a method comprising:
- detecting each pinch with each soft object using a first pinch detection system, each soft object having a stiffness lower than a first predetermined threshold;
- detecting each pinch with each hard object using a second pinch detection system, each hard object having a stiffness higher than a second predetermined threshold;
- when the second pinch detection system detects each pinch with each hard object, adapting a configuration setting of the first pinch detection system to configure the first pinch detection system to detect each pinch with each hard object;
- after adapting the configuration setting of the first pinch detection system, detecting each pinch with each hard object using the first pinch detection system; and
- determining that each pinch has occurred when the first pinch detection system has detected a physical property of the closure member.

12. The non-transitory, tangible computer-readable storage medium according to claim 11, wherein the executable instructions further comprise
determining that each pinch has occurred when the first pinch detection system has detected a physical property of a motor driving the closure member.

13. The non-transitory, tangible computer-readable storage medium according to claim 11, wherein detecting each second pinch using the second pinch detection system comprises applying a mathematical model of the open-roof assembly.

* * * * *